Aug. 27, 1946.      B. N. ASHTON ET AL      2,406,524
CONTROL UNIT AND DUMP VALVE
Filed March 18, 1943       6 Sheets-Sheet 4
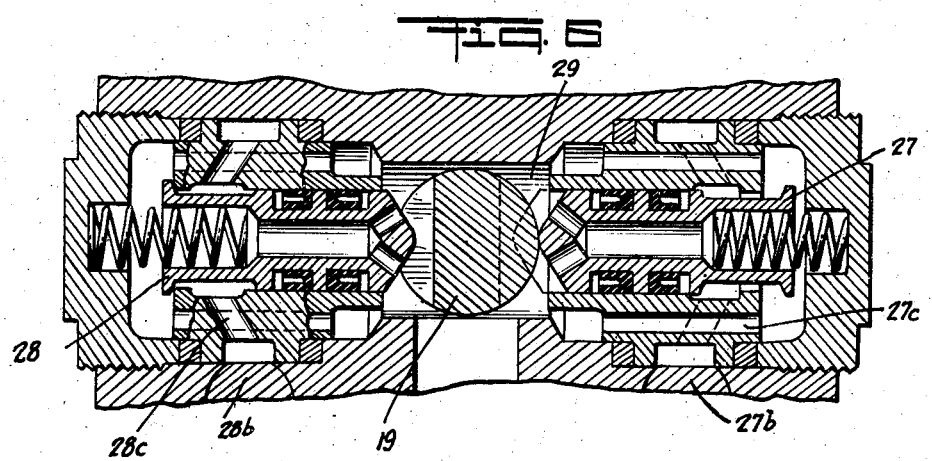
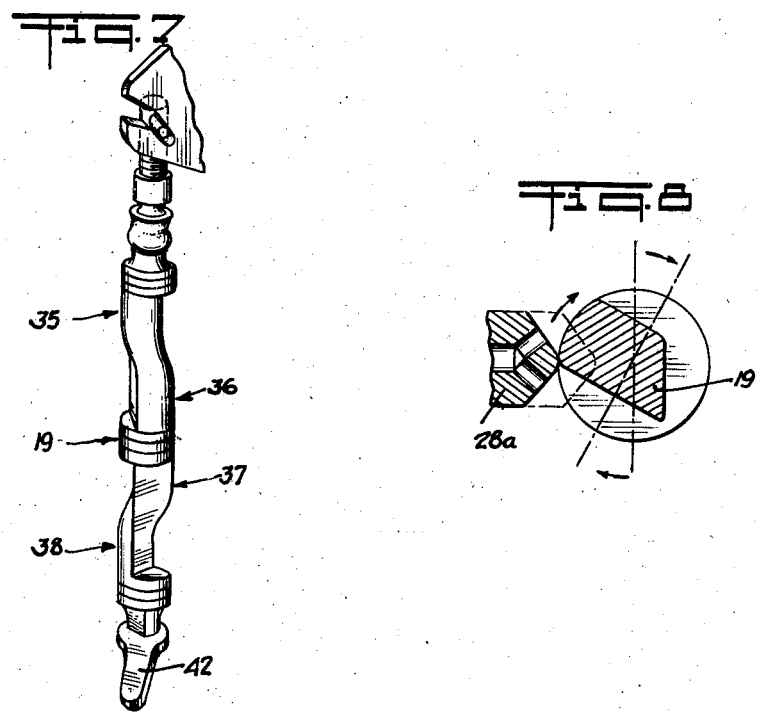
INVENTORS
BENJAMIN N. ASHTON
BY EUGENE V. BARKOW
ATTORNEY

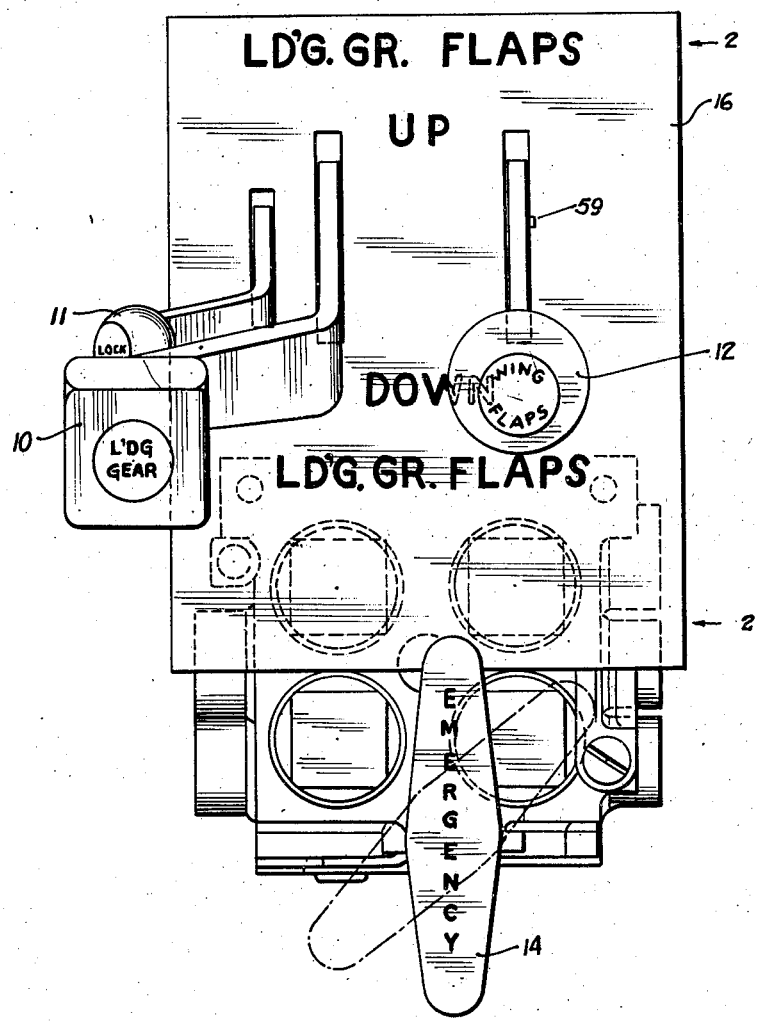

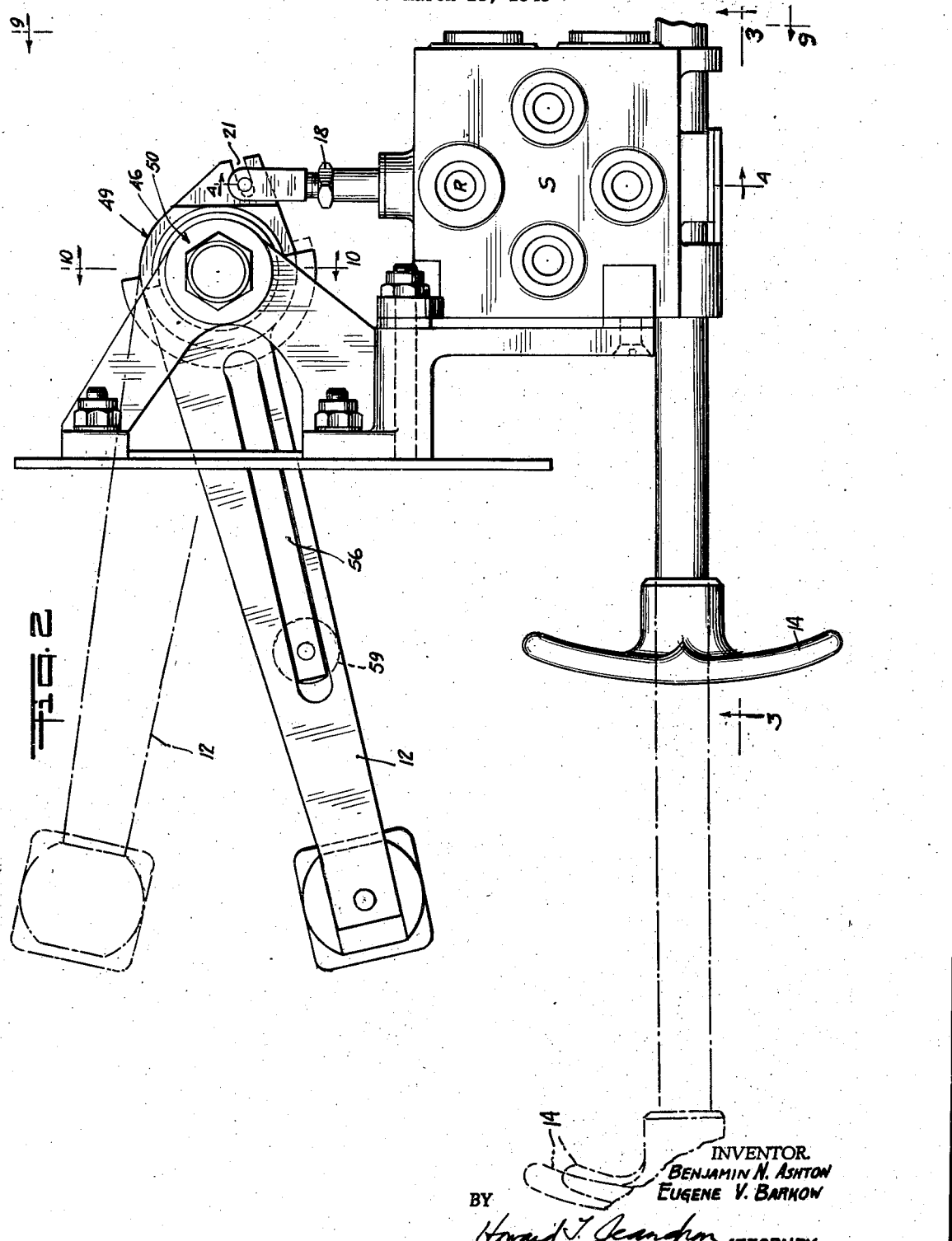

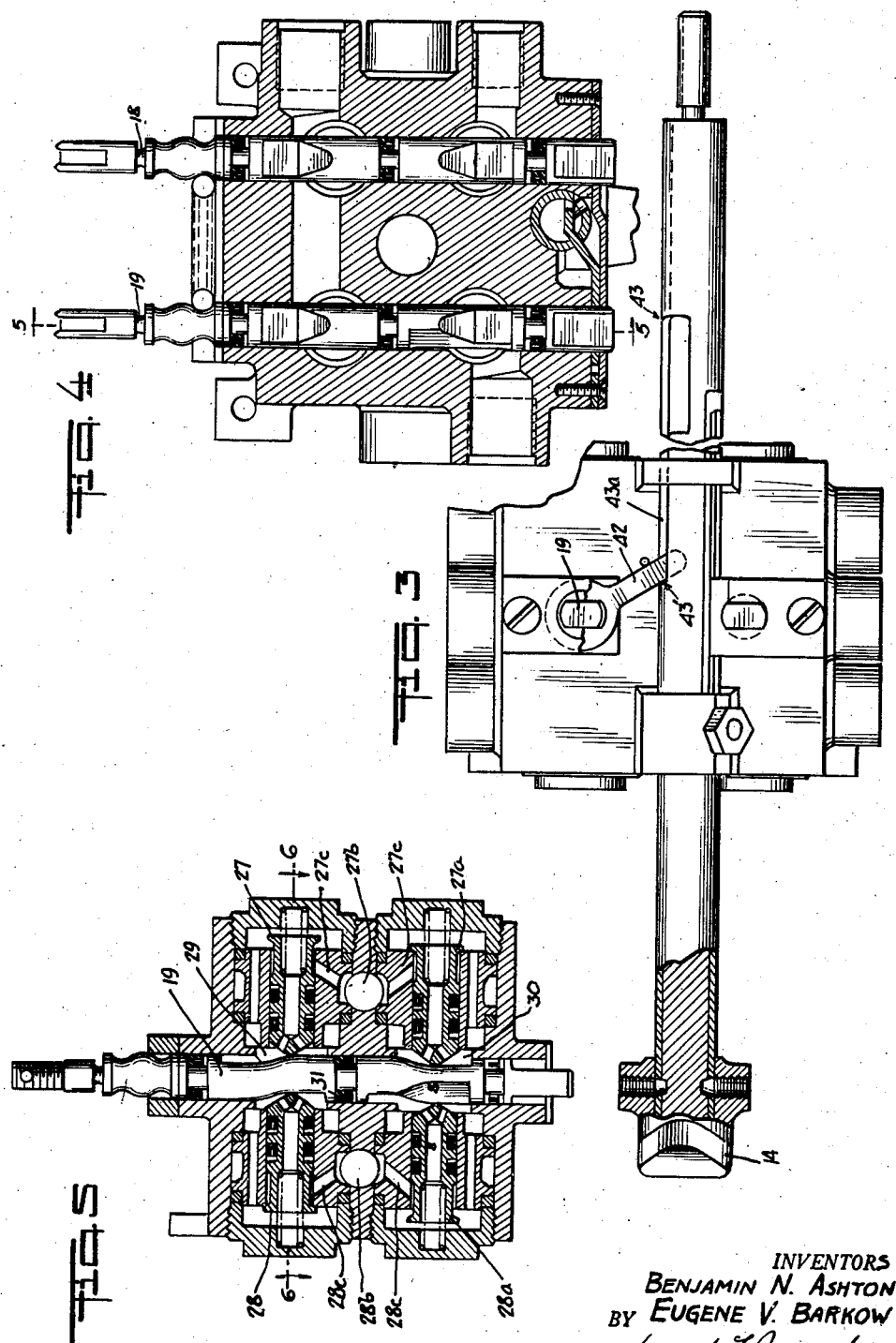

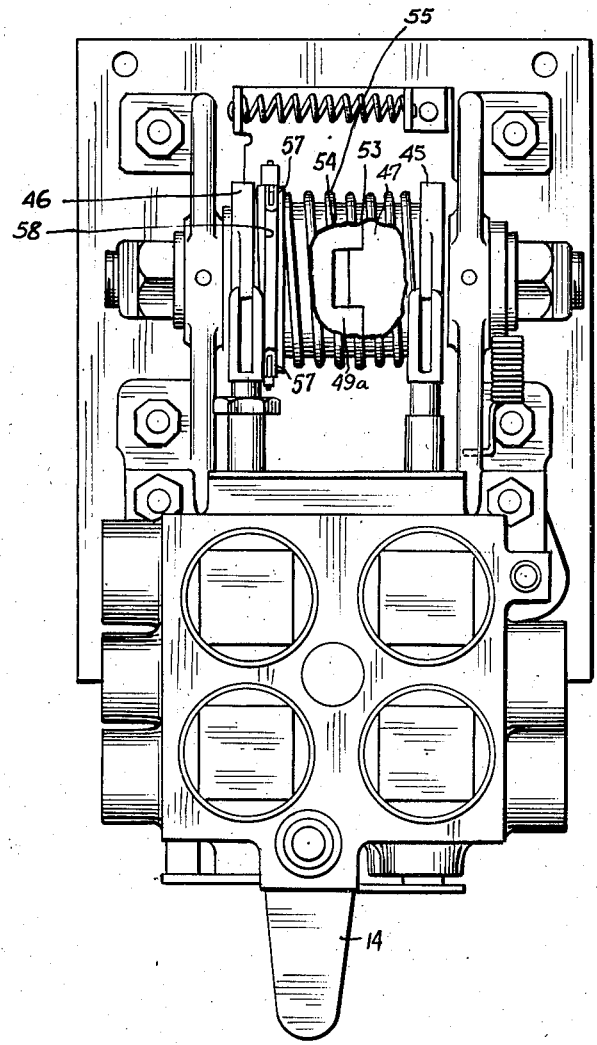

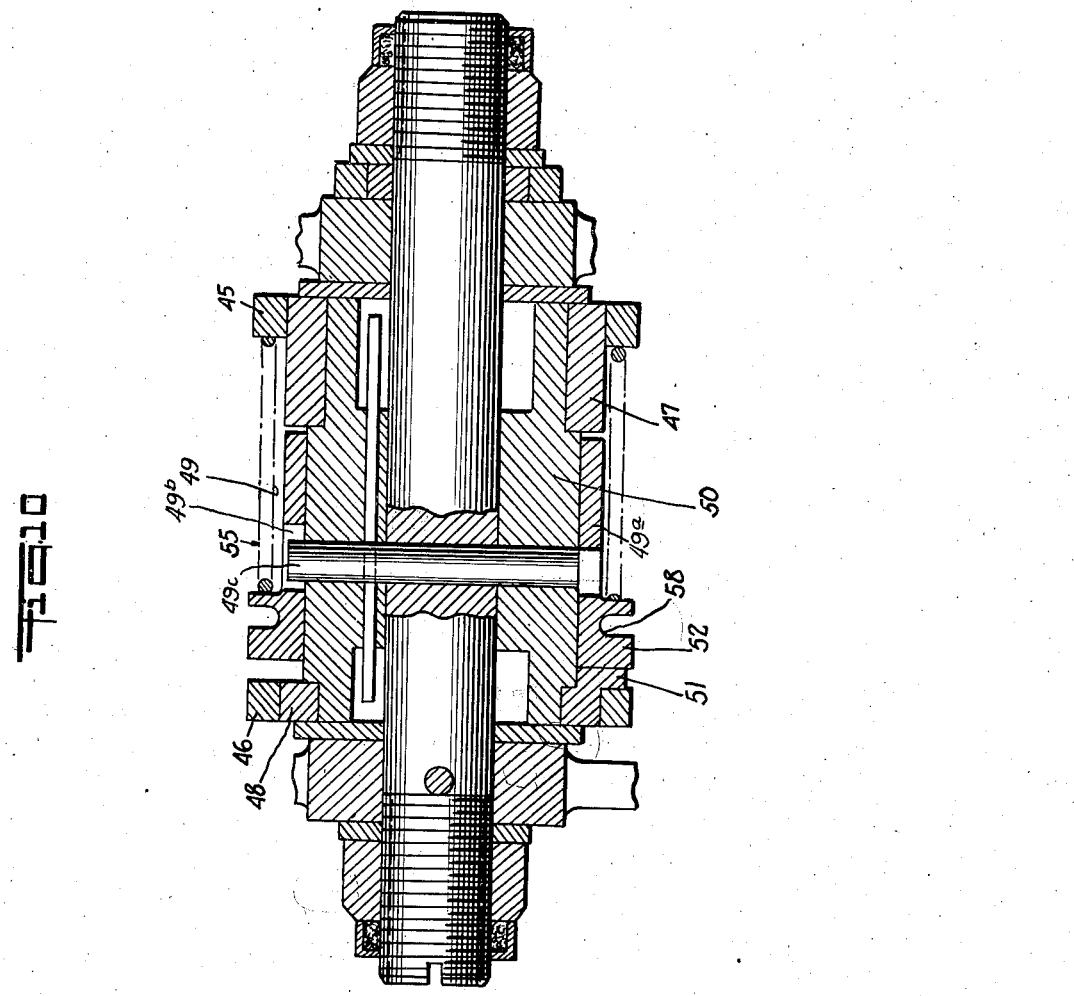

Patented Aug. 27, 1946

2,406,524

UNITED STATES PATENT OFFICE 2,406,524

CONTROL UNIT AND DUMP VALVE

Benjamin N. Ashton and Eugene V. Barkow, Kingston, N. Y., assignors to Electrol Incorporated, Kingston, N. Y., a corporation of Delaware Application March 18, 1943, Serial No. 479,586

4 Claims. (Cl. 121—46.5)

The present invention pertains to control units as used on aircraft for actuating double-acting hydraulic jacks to effect the raising and lowering of the undercarriage and the wing flaps.

It is an object of the present invention to provide an apparatus of the character described which shall be simple and rugged in construction, convenient in use, and which shall enable quick and accurate operation.

It is also an object of the present invention to provide a compact and efficient control mechanism for landing gear and flaps which shall include certain precautionary features to insure safety.

According to a feature of the present invention the control unit consists of a casing enclosing two sets of four poppet valves, of which two in each set are permanently connected to a suitable source of fluid pressure while the other two of each set communicate with a return line, one of the units governing the movement of the undercarriage and the other the wing flaps. The eight valves are symmetrically arranged in two adjacent systems of four valves each. Normally, one exhaust valve and one supply valve are in the closed position, while the oppositely positioned valves are in the open position. The opening of one pair of valves in our system while closing the oppositely positioned valves will produce a flow of fluid corresponding to the raising of the undercarriage. The opening of the corresponding pair of valves while closing their oppositely positioned and related valves in the other system will produce a flow of fluid corresponding to the raising of the wing flaps. The reversal of position of all oppositely positioned valves in either system, will produce a flow of fluid corresponding to the lowering of the landing gear and the wing flaps, respectively.

According to a further feature each valve system is provided with a plunger having cam-like portions adapted to engage the heads of said poppet valves for the purpose of opening one or the other pair of valves of the system to which the cam-plunger belongs. The one cam-plunger is so mounted in the casing that it is capable of two kinds of motion; to wit, axial displacement and rotation, while the other plunger is capable of axial displacement only.

According to a further feature of the present invention, the cam-shaped portions of both plungers are so positioned that they will open in both systems, the pair of valves producing the raising of the undercarriage and the wing flaps when one and the same kind of motion in one direction is imparted to both plungers and that they will open the other pair of valves in both systems when the same kind of motion in the other direction is imparted to them; finally, if the other kind of motion is imparted to said one plunger the cam-shaped portions will, regardless of the direction in which said other kind of motion is imparted, open in the one system the valves communicating with the return line while the fluid pressure supply valves remain closed.

According to another feature, the movements of said plungers are controlled by three levers engaging the same and projecting to the outside of said casing. One of said levers is the undercarriage operating lever and actuates the plunger associated with the valve system controlling the same, the other is the flap lever and actuates the plunger associated with the flap-controlling valve system, and the third is an emergency lever which engages one of said plungers. The undercarriage and flap levers are so connected to their correlated plungers that raising of a lever will impart one kind of motion; i. e., axial displacement in one direction to the respective plunger. Lowering of the lever will impart the same kind of movement to the plunger in the opposite direction. The emergency lever is so connected to one of the plungers that when actuated it will impart another kind of motion to the landing gear lever, which in turn opens the exhaust valves of the landing gear system.

By virtue of this arrangement the pilot is in a position to control the position of the undercarriage and the flaps by actuating the respective levers or, if for any reason the hydraulic system fails to respond, he can, by actuating the emergency lever, vent all fluid-actuated devices in the landing gear system so that the elements normally controlled by the same are free. This will allow the undercarriage to drop by gravity and thus afford immunity from belly landings due to a failure occurring in the hydraulic system.

The device may include a disengageable clutch mechanism of the type disclosed in the Filmer Patent No. 2,293,198, dated August 18, 1942, interposed between the hub of the landing gear lever and that of the flap lever and adapted normally to establish an automatic connection whereby the flap lever is carried along when the landing gear lever is raised and whereby the landing gear lever is lowered when the flap lever is completely lowered.

Further features may be gathered from the following description of an embodiment of the present invention given by way of example, and illustrated in the accompanying drawings:

Fig. 1 is a front view in elevation of the control unit;

Fig. 2 is a side elevational view of the control unit as seen in the direction of arrows 2 in Fig. 1;

Fig. 3 is a bottom plan view partially in section taken on a line 3—3 of Fig. 2;

Fig. 4 is a cross-sectional view taken on the line 4—4 of Fig. 2 illustrating the valve systems;

Fig. 5 is a cross-sectional view taken on the line 5—5 of Fig. 4, illustrating the landing gear valve system and cam plunger;

Fig. 6 is an enlarged detail view taken on the line 6—6 of Fig. 5;

Fig. 7 is a perspective view of the landing gear cam plunger;

Fig. 8 is an enlarged detail of the portion of the cam plunger having a reduced cam area;

Fig. 9 is a rear elevational view of the control unit, and

Fig. 10 is a cross-section of the clutch unit, taken on line 10—10 of Fig. 2.

Referring to Figures 1 to 5, numerals 10, 12 and 14 designate the landing gear, wing flap and emergency levers, respectively. The lever 10 is locked in its lowered position by conventional means, and an auxiliary lever 11 is provided to release the lock and must be operated before the principal lever 10 can be moved.

The levers 10 and 12 are connected to a clutch mechanism which will be described later, and, as they are raised or lowered, they displace valve actuating plungers 18 and 19 up and down. The plunger 18 is connected to the lever 12 by means of a pin and slot connection 21, as shown in Figure 2. The plunger 19 is similarly connected to the lever 10.

The valves illustrated are similar to the valves disclosed in the Ashton application Serial No. 426,260, filed January 9, 1942, now Patent No. 2,349,069, dated May 16 1944.

The poppet valves 28 and 28a control the flow of liquid through port 28b and passages 28c to the one side of the cylinder of the jack that projects and retracts the landing gear. Of the two adjacent chambers 29 and 30 in the illustrated embodiment, chamber 30 communicates with a source of fluid pressure and the other with a return line. A suitable seal 31 prevents communication between chambers 29 and 30.

The poppet valves 27 and 27a control the flow of liquid to opposite sides of the landing gear jack through port 27b and passages 27c, and valves 27 and 28 control the flow of liquid from the opposite sides of the jack through chamber 29 to the return line. The valves 28a and 27a control the flow of liquid to the jack from the chamber 30.

Figure 5 shows the landing gear valves in the position corresponding to the lowering of the landing gear. In this position the valves 27 and 28a are displaced from their seats while the valves 27a and 28 engage their seats. In this position, liquid under pressure flows into one end of the jack from the chamber 30 and through the port 28b, while the liquid on the opposite side of the piston is discharged through the port 27b to the return chamber 29. Raising of the lever 10 will cause plunger 19 to descend, whereby the position of the valves will be reversed; i. e., valves 28a and 27 engage their seats and the valves 28 and 27a will be displaced from their seats.

The arrangement of the lever 12, plunger 18 and the flap control valves is exactly the same and controls the operation of the jack for operating the wing flaps.

Figure 7 shows the cam faces of plunger 19. In its normal position and depending upon the upward or downward displacement of plunger 19, faces 36 and 38 unseat the associated valves 27 and 28a, respectively, and faces 35 and 37 unseat the valves 28 and 27a.

The portion of plunger 19 disposed in the chamber 29 and having the cam surfaces 35 and 36 thereon has a large area and its section in the zones of the cam surfaces 35 and 36 corresponds to more than half of a cylinder (Figure 6). The portion of the plunger disposed in the chamber 30 has a cross-sectional shape like that disclosed in Figure 8, that is, it has two parallel surfaces spaced apart less than the diameter of the plunger 19, a third surface connection with the axis of said plunger and an inclined surface connecting the parallel surfaces. The cams are so disposed that when a rotary movement of 30°, in the direction indicated in Figure 8, is imparted to plunger 19, valves 28 and 27 will both be opened and valves 28a and 27a will both be closed.

Figure 3 illustrates the construction and operation of the emergency lever 14. The lever 14 is capable of axial movement and is provided with a slot 43a. The face 43 at the end of the slot 43a is engageable with a lever 42 rigid with plunger 19, whereby outward axial movement of the lever 14 rotates the plunger 19. The plunger 19 is rotatably mounted in the poppet valve structure, as shown in Figures 3, 4 and 5.

By virtue of this arrangement, a forward movement of the emergency lever 14 will close the admission valves and open the exhaust valves for the landing gear system. On the other hand, whenever an emergency has passed, the return of lever 14 to its normal position will cause face 43' to engage the lever 42 and return the plunger 19 to its normal position, thus restoring the control unit to its normal operative position.

The plunger 18 is similar to plunger 19, except for the size of the cam areas which is uniform. The plunger 20 is not provided with a lever at its end, inasmuch as rotary motion of plunger 20 is not required.

The mounting of levers 10 and 12 and the clutch mechanism governing the sequence of their movements are illustrated in Figures 2, 9 and 10. The clutch mechanism is of the type disclosed in the Filmer Patent No. 2,293,198.

The levers 10 and 12 are mounted on hubs 46 and 45, respectively. The hub 45 is fixed to sleeve 47, and, similarly, the hub 46 is fixed to the collar 48. Between the hubs 45, 46 there is provided a clutch mechanism 49. Elements 47 and 48 are rotatably mounted on the drum 50.

The collar 48 has, over a portion of its periphery, a projection 51. The wall of the portion 52 on the clutch sleeve 49a adjacent projection 51 is recessed to receive the projection 51 to cause the sleeves 48 and 49a to move simultaneously. The sleeve 49a is provided with a slot 49b that extends partially around its circumference, has an inclined end portion and receives a pin 49c carried by the hub 50. The slot 49b is so shaped that when the lever 12 is in its lowermost position and the pin 49c engages the inclined end of the slot 49b, the sleeve 49a is displaced to the right, as viewed in Figure 10, to disengage the projection 51 from the recess in portion 52.

The sleeve 47 has a projection 53 (shown in exposed section in Figure 9) extending toward clutch 49 and adapted to engage in a deeper recess 54 (Figure 9) in the clutch sleeve 49a. The sleeve 47 is otherwise spaced from the clutch sleeve 49a to permit axial movement of the latter sufficient to disconnect the sleeve 49a from the sleeve 48.

A spring 55 urges the clutch sleeve 49a against the projection 51.

With the structure described above, the clutch sleeve 49a normally engages the collar 48 and rotates in accordance with the movements of lever 12. When the latter is completely lowered, the projection 51 will be displaced by engagement of the pin 56 in the end of the slot 49b. In that position, clutch 49 will be free from sleeve 48 and the hub 46. Accordingly, the lever 10 may be operated to raise or lower the landing gear without affecting the position of the wing flaps.

In all other normal positions, the clutch sleeve 49a will be in engagement with both collar 48 and the sleeve 47 and accordingly the wing flap and landing gear levers will move together when one of them is actuated.

This arrangement may be unsatisfactory at times inasmuch as practically no movement of the flaps is possible without moving the landing gear. Free movement of the flaps independently of the landing gear is, however, required in flight at times. To meet this requirement, there is provided a release mechanism which will shift the clutch sleeve 49a to the right, so as to cause it to disengage projection 51. To that end, arm 56, carried in a slot in lever 12 is provided with fingers 57, which slidably engage in the annular groove 58 in the clutch 49. When the operator displaces arm 56, for instance by pressing on knob 59 (Fig. 1), fingers 57 will shift clutch 49 and this will make it possible to move the flap lever without affecting the landing gear lever.

The foregoing description is not intended to limit the present invention which extends to all changes, modifications and equivalents within the scope of the appended claims.

What is claimed is:

1. A control unit for an hydraulic landing gear jack, said jack having a cylinder and a piston, comprising a first valve unit containing a plurality of valves for controlling the movements of a landing gear jack, an axially movable and rotatable cam member for actuating said valves, said cam member having cam surfaces to actuate said valves to supply liquid to said cylinder on one side of said piston and discharge liquid from the cylinder on the opposite side of said piston upon axial movement in one direction, and to actuate said valves to supply liquid to said cylinder on said opposite side and discharge liquid from said one side upon axial movement in the opposite direction, said cam member being rotatable in one direction to actuate said valves to discharge liquid from said cylinder on both sides of said piston simultaneously, a first lever for moving said cam member axially, and a control member for rotating said cam member.

2. An hydraulic control unit for a hydraulic jack having a cylinder and a piston comprising a first multiple valve unit, said unit having a liquid supply port, a liquid return port, a first port adapted to be connected to said cylinder for supplying fluid to move said piston in one direction, a second port adapted to be connected to said cylinder for supplying fluid to move said piston in the opposite direction, valves interposed between said fluid supply port, said return port and said first and second ports, an axially movable and rotatable cam member for opening and closing said valves, said cam member having cam surfaces thereon for actuating said valves upon movement of said cam member in one direction with one kind of motion to connect said first port with said supply port and said second port with said return port, and for connecting said second port with said supply port and said first port with said return port upon movement of said cam member in the opposite direction with said one kind of motion, said cam surfaces acting also to actuate said valves to connect said first and second ports simultaneously with said return port upon the other kind of motion of said cam member in one direction and separate means for selectively moving said cam member axially and for rotating it.

3. A control unit for hydraulic systems, comprising a valve unit having an inlet port, a return port, first and second supply ports, a first pair of passages connecting said inlet port to said first and second supply ports, a second pair of passages connecting said return port to said first and second supply ports, a valve in each of said passages normally biased to closed position, a cam shaft mounted in said unit for rotary and axial movement and having cam surfaces engageable with each of said valves, said cam surfaces being formed to open the valves in the passage connecting said inlet port and said first supply port, and in the passage connecting said second supply port and said return port upon movement of said cam shaft in one direction with one of said movements and to open the valves in the passage connecting said inlet port and said second supply port and in the passage connecting said first supply port and said return port upon movement of said cam shaft in the opposite direction with said one kind of movement, said cam shaft having other cam surfaces formed to open the valves in the passages connecting said return port to said first and second supply ports upon movement of said cam shaft in one direction with the other kind of movement.

4. A control unit for hydraulic systems, comprising a valve unit having an inlet port, a return port, first and second supply ports, a first pair of passages connecting said inlet port to said first and second supply ports, a second pair of passages connecting said return port to said first and second supply ports, a valve in each of said passages normally biased to closed position, a cam shaft mounted in said unit for rotary and axial movement and having cam surfaces engageable with each of said valves, said cam surfaces being formed to open the valves in the passage connecting said inlet port and said first supply port, and in the passage connecting said second supply port and said return port upon axial movement of said cam shaft in one direction and to open the valves in the passage connecting said inlet port and said second supply port and in the passage connecting said first supply port and said return port upon axial movement of said cam shaft in the opposite direction, said cam shaft having other cam surfaces formed to open the valves in the passages connecting said return port to said first and second supply ports upon rotary movement of said cam shaft in one direction.

BENJAMIN N. ASHTON.
EUGENE V. BARKOW.